April 26, 1960 D. RICHMAN 2,934,598

PHASE DETECTOR FOR COLOR TELEVISION RECEIVERS

Filed March 23, 1955 2 Sheets-Sheet 1

April 26, 1960 D. RICHMAN 2,934,598

PHASE DETECTOR FOR COLOR TELEVISION RECEIVERS

Filed March 23, 1955 2 Sheets-Sheet 2

United States Patent Office 2,934,598
Patented Apr. 26, 1960

2,934,598

PHASE DETECTOR FOR COLOR TELEVISION RECEIVERS

Donald Richman, Fresh Meadows, N.Y., assignor to Hazeltine Research, Inc., Chicago, Ill., a corporation of Illinois Application March 23, 1955, Serial No. 496,172

14 Claims. (Cl. 178—5.4)

The invention relates to phase detectors and, particularly, to phase detectors for developing both in-phase and quadrature-phase control signals. Though the invention is not limited thereto, such phase detectors have particular utility for effecting synchronization of the color-signal deriving circuits of an NTSC type of color-television receiver from a received color burst synchronizing signal and the invention will be described in such environment.

In an NTSC type of color-television receiver, a locally generated signal is heterodyned in synchronous detectors with different phases of a received subcarrier wave signal modulated at specific phases by color-signal components to derive such components therefrom. In order that such color-signal components be faithfully derived from such specific phases of the subcarrier wave signal, the locally generated signal is controlled in phase by means of a received color-synchronizing or burst signal. Such phase control may be effected by means of conventional automatic-phase-control (APC) circuits wherein the color burst and locally generated signals are compared in phase by means of a simple balanced phase detector to develop a control signal representative of any phase deviation of the locally generated signal with respect to a specific phase relationship with the color burst signal. Such control signal may then be employed by means of a reactance circuit to control the frequency of operation of the local oscillator to maintain such specific phase relationship. However, such a simple conventional phase-control system does not have the wide pull-in range, controllable sensitivity or versatility of operation of a phase-detection system, known as the quadricorrelator, which develops both in-phase and quadrature-phase control potentials. A phase-detection system of the latter type is more fully described in an article entitled "The D.C. Quadricorrelator: A Two-Mode Synchronization System," in January 1954 issue of the Proceedings of the I.R.E. at pages 288–299.

In order to obtain satisfactory operation of either of these phase detectors, a color burst synchronizing signal of relatively high intensity should be employed. This usually requires a stage or two of amplification for the color burst signal prior to the phase detector. In prior forms of the quadricorrelator, actual amplifier stages were employed. The improved phase detector in accordance with the present invention is a quadricorrelator providing both in-phase and quadrature-phase control potentials with a minimum of stages which serve only as amplifiers prior to the detector.

It is, therefore, an object of the present invention to provide a new and improved phase detector which does not have one or more of the above-mentioned limitations and disadvantages of prior phase detectors.

It is an additional object of the present invention to provide a new and improved phase detector providing amplification of the color burst synchronizing signal.

It is a still further object of the present invention to provide a new and improved phase detector having maximum sensitivity for nonsynchronous conditions and minimum sensitivity for synchronous conditions of operation of a local generator controlled by such phase detector.

It is finally an object of the present invention to provide a new and improved phase detector of simple and inexpensive construction.

In accordance with the present invention, a phase detector for developing both in-phase and quadrature-phase control signals comprises means for supplying a first signal and means including a phase-shifting means for supplying a second signal with two phases in quadrature. Such phase detector also comprises a first phase-detection means, including a pair of output circuits, the detection means being responsive to the first signal and one phase of the second signal having a specific average phase relation in the first detection means for developing in one of the output circuits a control signal, and being responsive to the first signal for developing in another of the output circuits an amplified signal representative of the first signal. The phase detector also comprises second phase-detection means coupled in series with the first detection means and responsive to the aforesaid amplified signal and to the other phase of the second signal having an average phase relation in quadrature with the specific phase relation for developing therefrom a second control signal.

For a better understanding of the present invention, together with other and further objects thereof, reference is had to the following description taken in connection with the accompanying drawings, and its scope will be pointed out in the appended claims.

Referring to the drawings.

Figure 1:
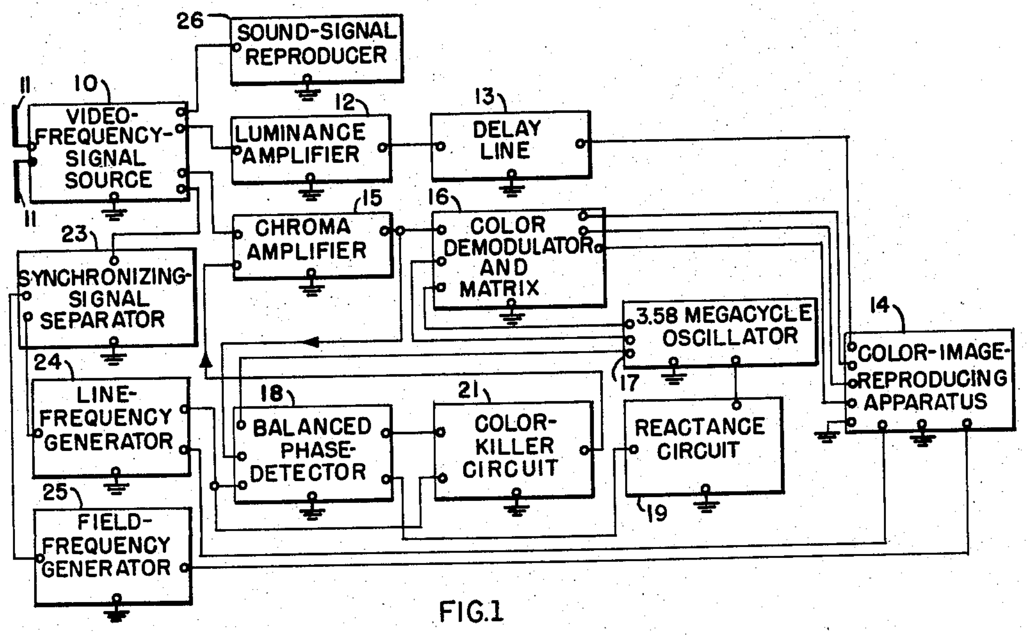
Fig. 1 is a schematic diagram of a color-television received including a phase detector constructed in accordance with the present invention.

*General description of color-television receiver of Fig. 1*

Referring now more particularly to Fig. 1 of the drawings, there is represented a color-television receiver of a compatible type suitable for utilizing an NTSC type of color-television signal. Such receiver includes a video-frequency signal source 10 which may, for example, comprise a radio-frequency amplifier having an input circuit coupled to an antenna 11, an oscillator-modulator, an intermediate-frequency amplifier, and a video-frequency signal detector. An output circuit of the source 10 is coupled through a luminance channel, specifically through a luminance amplifier 12 and a delay line 13, in cascade in the order named, to an input circuit of a color-image-reproducing apparatus 14. The luminance amplifier 12 may be a conventional wide band amplifier having, for example, a pass band of approximately 0–4.2 megacycles. The delay line 13 may be a conventional line for equating the time of travel of the signal through the units 12 and 13 with that for the chrominance signal through a chrominance channel to be described hereinafter. The color-image-reproducing apparatus 14 may be of conventional construction for utilizing signals representative of luminance and chrominance, or components derived therefrom, to reproduce a color image.

An output circuit of the video-frequency signal source is also coupled through a chrominance channel to input circuits of the apparatus 14. Such chrominance channel may comprise, in cascade in the order named, a chroma amplifier 15 and a color demodulator and matrix circuit 16. The chroma amplifier may be a conventional unit having a pass band of approximately 2–4.2 megacycles for translating the modulated subcarrier wave signal and its side bands. The color demodulator and matrix circuit 16 may comprise conventional synchronous detectors for deriving color-difference signals from specific phases of the modulated subcarrier wave signal and a conventional matrix circuit for combining such derived signals to develop, for example, the color-difference signals $R-Y$, $B-Y$, and $G-Y$, representative, respectively, of the red, blue, and green of a televised color image. A pair of output circuits of a 3.58 megacycle oscillator 17 are coupled to a pair of input circuits of the unit 16 for applying properly phased, locally generated signals to the synchronous detectors in the unit 16 to effect faithful derivation of the desired modulation components from specific phases of the subcarrier wave signal.

The output circuit of the chroma amplifier 15 and an output circuit of the oscillator 17 are coupled to different input circuits of a balanced phase detector 18 constructed in accordance with the present invention and to be described more fully hereinafter. An output circuit of the detector 18 is coupled through a reactance circuit 19 to an input circuit of the oscillator 17. Another output circuit of the detector 18 is coupled through a color-killer circuit 21 to a gain-control circuit of the amplifier 15.

An output circuit of the video-frequency signal source 10 is also coupled through a synchronizing-signal separator 23 to input circuits of a line-frequency generator 24 and a field-frequency generator 25, output circuits of the latter generators being coupled, respectively, to horizontal and vertical deflection windings in the apparatus 14. An output circuit of the generator 24, for example a winding on the horizontal deflection transformer therein, is coupled to input circuits of the phase detector 18 and the color-killer circuit 21.

An additional output circuit of the video-frequency signal source 10 is coupled to a sound-signal reproducer 26 which may include, for example, a sound-signal intermediate-frequency amplifier, a signal detector, an audio-frequency amplifier, and a sound-signal reproducing device, such as a loudspeaker.

All of the units thus far described and their combination, with the exception of the balanced phase detector 18, may be of conventional construction, well known in the color-television art, and, therefore, no more detailed description of such units is provided herein.

*General explanation of operation of color-television receiver of Fig. 1*

For the purpose of general explanation of the operation of the receiver of Fig. 1, it will initially be assumed that the balanced phase detector 18 is of conventional construction and operates in a conventional manner. In the video-frequency signal source 10, a conventional NTSC type of color-television signal may be intercepted by the antenna 11, selected and amplified by the radio-frequency amplifier in such unit, modified to an intermediate frequency by means of an oscillator-modulator, further amplified by means of an intermediate-frequency amplifier, and the modulation components of such intermediate-frequency television signal detected by means of a conventional detection system. Such modulation components comprise a composite color video-frequency signal and an intermediate-frequency sound signal. The composite video-frequency signal includes a luminance component, a chrominance component, and synchronizing components including line-frequency, field-frequency, and color burst synchronizing signals. The luminance component is amplified in the unit 12, delayed in translation by the delay line 13, and applied to a control circuit of the apparatus 14. The chrominance component, comprising a subcarrier wave signal modulated at specific phases by components representative of chrominance, is translated through the amplifier 15 and applied to an input circuit of the color demodulator and matrix 16. In the unit 16, synchronous detectors derive modulation components from specific phases of the subcarrier wave signal by means of a heterodyning of the applied subcarrier wave signal with properly phased signals developed in the oscillator 17. The derived components are combined in a matrix circuit to develop, for example, $R-Y$, $B-Y$, and $G-Y$ color-difference signals. These color-difference signals are applied to input circuits of the apparatus 14 wherein, at least effectively, they individually combine with the luminance signal applied to the apparatus 14 to develop, for example, color signals R, G, and B representative, respectively, of the red, green, and blue components of a televised color image.

The line-frequency and field-frequency synchronizing components are separated from other components in the separator 23 and utilized, respectively, to synchronize the operations of the line-frequency generator 24 and field-frequency generator 25 with the operations of corresponding units at the transmitter. The line-frequency and field-frequency signals developed, respectively, by the generators 24 and 25 are employed in the apparatus 14 to effect, respectively, horizontal and vertical deflection of the electron beams in such apparatus to scan a raster on the image screen therein. Such scanning operation, combined with intensity-modulation of the electron beams in the apparatus 14 by the three color signals, results in a color reproduction of the televised image.

The color burst synchronizing signal is translated through the amplifier 15 and applied to an input circuit of the balanced phase detector 18. The signal developed in the oscillator 17 is also applied to an input circuit of the phase detector 18. This detector is gated into operation at approximately the time of the burst signal by means of a flyback pulse applied thereto by the generator 24. In the detector 18 the phases of the color burst and locally generated signals are compared and any deviation of these signals from a specific phase relation, for example, a quadrature-phase relation, results in the developing of a control potential which is applied to the reactance circuit 19 to control the operation of the oscillator 17 to maintain such specific phase relationship. A signal developed in the phase detector 18 is also applied to the color-killer circuit 21 to control the operation thereof to develop one output signal when a burst is present and a different output signal when a burst is not present. The color-killer circuit 21 is also rendered operative solely during the time of the burst signal by means of a line flyback pulse applied thereto from the generator 24 and develops substantially zero output potential when a color burst signal is present and the oscillator 17 is synchronized and develops a large negative potential when such color burst signal is not present or the oscillator 17 is not synchronized. Such large negative potential is applied to the gain-control circuit of the amplifier 15 to render such amplifier nonconductive when no burst signal is being received or the oscillator 17 is not synchronized.

The intermediate-frequency sound signal developed in the source 10 is applied to the sound-signal reproducer 26 wherein it is further amplified and the sound-signal components thereof derived. These derived components are amplified in an audio-frequency amplifier and utilized in a sound-signal reproducing device such as a loudspeaker to reproduce sound.

Figure 2:
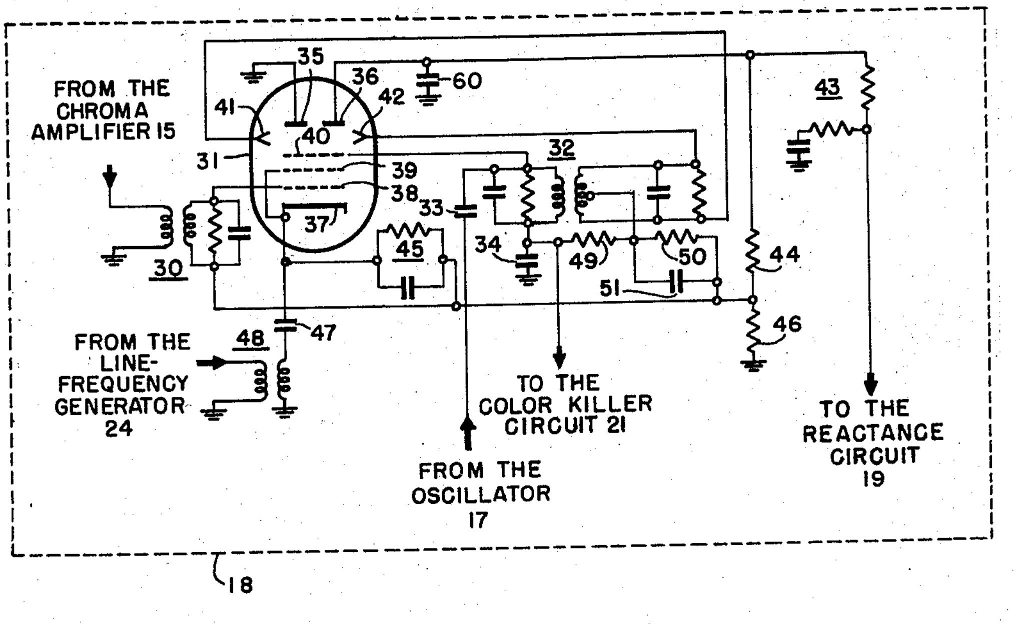
Fig. 2 is a detailed circuit diagram of one embodiment of such phase detector.

*Description of balanced phase detector of Fig. 2*

Considering now in detail an embodiment of the phase detector 18 of Fig. 1, specifically the embodiment represented in Fig. 2, such detector comprises means for supplying a pair of signals, one of reference phase and the other of controllable phase with, for example, the signal of controllable phase being supplied with two phases in quadrature. This supply means comprises, specifically, a transformer 30 for supplying the reference-phase or color burst synchronizing signal and a transformer 32 for supplying a controllable phase or locally generated signal with one phase in the primary of the transformer and with a phase in quadrature with the one phase in the secondary of the transformer 32. The primary winding of the transformer 30 is coupled to a source of color burst synchronizing signal, for example, to the output circuit of the chroma amplifier 15 of Fig. 1 while the primary winding of the transformer 32 is coupled to a source of the signal to be controlled in phase, for example, such winding is coupled through a condenser 33 to an output circuit of the oscillator 17 of Fig. 1. The primary and secondary windings of the transformer 32 and the secondary winding of the transformer 30 are elements of different resonant circuits each broadly tuned to the frequency of the color burst synchronizing signal and that of the locally generated signal, that is, to frequency of approximately 3.58 megacycles. The secondary winding of the transformer 32 is center-tapped and the coupling between the primary and secondary windings of this transformer is such as to effect substantially a 90° phase shift in a signal coupled from one winding to the other.

The phase detector 18 of Fig. 2 also includes a first phase-detection circuit responsive to the supplied signals including a phase-shift circuit for modifying the phase relation of these signals so they have a specific average phase relation in the detection circuit and at least effectively including a pair of output circuits for developing one of the control signals in one thereof and one of the supplied signals amplified in the other thereof. More specifically, such first phase-detection circuit comprises a portion of the vacuum tube 31, which is of the beam-deflection type, such as, for example, a modified 6AR8 type of tube, and the circuits coupled to such portion of the tube. The portion of the tube 31 included in the first phase-detection circuit includes a cathode 37, a control electrode 38, a focusing electrode 39, and a screen electrode 40. The cathode 37 is coupled through a condenser 47 and the secondary winding of a transformer 48 to a reference potential, for example, to chassis ground. The primary winding of the transformer 48 is coupled to a source of flyback pulses for periodically driving the cathode 37 negative with respect to ground, for example, to a tap on the deflection transformer in the line-frequency generator 24 of Fig. 1. The first control electrode 38 is coupled through the secondary winding of the transformer 30 and through a biasing network 45 to the cathode 37. The screen electrode 40 is coupled through a condenser 33 to an output circuit of the oscillator 17. A phase-shift circuit comprising, in series, a resonant circuit including the primary winding of the transformer 32 and a condenser 34 is coupled between the screen electrode 40 and chassis ground. The condenser 34 has a low impedance for signals of subcarrier wave signal frequency but a high impedance for low-frequency beat or heterodyne signals. For the latter signals, the screen electrode 40 is connected to an output circuit including, in series, the primary winding of the transformer 32, a resistor 49, and a resistor 50 for developing the in-phase control signal for application to the color-killer circuit 21. The electron coupling between the screen electrode 40 and a pair of deflection electrodes 41 and 42 and a pair of anodes 35 and 36 effectively comprises another output circuit for the first phase-detection circuit. The latter output circuit is effective to develop an amplified color burst synchronizing signal for application to another phase-detection circuit now to be described.

The phase detector 18 also includes another phase-detection circuit at least effectively coupled in series with the first phase-detection circuit and responsive to both the amplified supplied signal and the other of the supplied signals. This other phase-detection circuit includes a phase-shift circuit for modifying the phase relation of the amplified and other of the supplied signals so they have an average phase relation in quadrature with the aforementioned specific phase relation for these signals. More specifically, such other phase-detection circuit includes the remaining portion of the tube 31 and the circuits associated therewith, that is, the pair of deflection electrodes 41 and 42 coupled to opposite terminals of the phase-shift circuit including the secondary winding of the transformer 32 and the pair of anodes 35 and 36 one of which is directly coupled to ground and the other of which is coupled to ground for high-frequency signals by means of a condenser 60 having a low impedance for signals of frequencies of the order of the subcarrier wave signal. The anode 35 is coupled to the cathode 37 through a load resistor 46 and the biasing network 45 and the anode 36 is coupled to the cathode through a load resistor 44 and the same biasing network. Preferably, the resistors 44 and 46 are of equal magnitude. The other phase-detection circuit also includes an output circuit, specifically, the low-pass filter network 43 coupled to the anode 36 for developing the quadrature-phase control signal for application to the reactance circuit 19. The coupling in the transformer 32 is such as to cause the locally generated signals developed in the primary and secondary windings thereof to be in substantially quadrature phase. When the oscillator 17 is synchronized, the locally generated signal applied to the screen electrode 40 is, on the average, in phase with the color burst signal applied to the control electrode 38 while the signal applied to the deflection electrodes 41 and 42 is, on the average, in quadrature phase with such color burst signal.

The phase detector 18 may also include means for utilizing one of the control signals developed in an output circuit of the phase detector for controlling the gain of the tube 31. More specifically, such utilizing means comprises the circuit connecting the junction of the resistors 49 and 50 to the tap of the secondary winding of the transformer 32 for applying the potential developed at the junction of these resistors to the deflection electrodes 41 and 42 as a biasing potential. A condenser 51 is coupled between this junction and the cathode circuit of the tube 31 for by-passing high-frequency signals having frequencies of the order of the subcarrier wave signal.

*Explanation of operation of phase detector of Fig. 2*

In considering the operation of the phase detector 18 of Fig. 2, the operation of the phase-detection circuit for developing the quadrature-phase control potential for controlling the phasing of the oscillator 17 will first be discussed. It will be assumed initially that the oscillator 17 of Fig. 1 is developing a locally generated signal for application to the deflection electrodes 41 and 42 of the tube 31 of such phase relation with respect to the color burst signal applied to the electrode 38 that no differential control potential is developed. In other words, it is assumed that the oscillator 17 is synchronized, that is, is developing a signal of the same frequency as the burst synchronizing signal and with the proper specific average phase with respect thereto. This occurs when the signal applied to the deflection electrodes 41 and 42 is in quadrature phase with the signal applied to the control electrode 38. When a negative-going flyback pulse is applied to the cathode 37 to render the tube 31 conductive, current flows to one of the anodes in the tube 31 during one half cycle of the signal applied to the deflection electrodes 41 and 42 and to the other anode thereof during the next half cycle of such signal. The average current flowing to the anode 35 under such conditions returns to the cathode 37 through the resistor 46 thereby developing a potential across the resistor 46 which is positive with respect to ground. The average current flowing through the anode 36 similarly flows through the resistor 44. Since the resistors 44 and 46 are of equal magnitude, if the same average current flows to the two anodes 35 and 36, as will occur when the signal applied to the deflection electrodes 41 and 42 is in quadrature with the signal applied to the control electrode 38, then the potentials across the resistors 44 and 46 cancel each other and zero differential potential is developed for application to, and control of, the reactance circuit 19.

If the phase of the locally generated signal tends to lead that of the color burst signal so that the quadrature-phase relation of these signals is not present in the tube 31, then more average current will flow to one of the anodes 35 and 36 than to the other and a potential of one sense will be developed across the resistors 44, 46. This potential is utilized to control the frequency of the signal developed in the local oscillator so that such signal is properly phased with respect to the color burst signal. If the phase of the locally generated signal tends to lag that of the color burst signal, then a control potential of opposite sense will be developed across the resistors 44 and 46 for utilization in controlling the phase of the locally generated signal.

The phase-detection circuit just considered is at least effectively in series with an in-phase detection circuit which not only develops the in-phase control signal for utilization in the color-killer circuit 21, but also amplifies the color burst signal prior to its use in cooperation with the deflection electrodes 41, 42 and the anodes 35 and 36 to develop the quadrature-phase control signal. Regardless of the state of synchronization of the oscillator 17, the color burst signal is amplified in being translated from the control electrode 38 through the screen electrode 40 so that an amplified color burst signal is utilized in the quadrature-phase detector. In addition, if the color burst and locally generated signals are properly phased, that is, if the signal on the electrode 38 is in quadrature with the signal on the deflection electrodes 41 and 42, then because of the quadrature phase relation of the signals in the primary and secondary circuits of the transformer 32, the signal on the electrode 38 is along an in-phase axis, that is, is either in phase or antiphase with the signal developed on the electrode 40 by means of the primary winding of the transformer 32. When the signals on the electrodes 40 and 38 are in phase, a maximum average screen electrode current flows through the primary winding of the transformer 32 and the resistors 49 and 50, returning to the cathode 37 through the biasing network 45. Such maximum flow of current causes the potential across the resistors 49 and 50 to have a maximum negative value with respect to the potential on the cathode 37. This maximum negative value is the in-phase control potential and is employed in the color-killer circuit 21 in the manner previously described herein, and described in the aforementioned article in the January 1954 Proceedings of the I.R.E., to render the chroma amplifier 15 conductive.

When the locally generated signal is not in proper phase relation with the color burst signal, then less average screen electrode current flows through the resistors 49 and 50, becoming approximately zero when the oscillator 17 is not synchronized. The zero potential developed under such conditions when applied to the color-killer circuit 21 causes the latter circuit to render the chroma amplifier 15 nonconductive except during periods when the color burst signal should be present in the receiver. Such latter conduction is controlled by the flyback pulse developed in the line-frequency generator 24.

In addition to developing potentials for controlling the state of conduction of the chroma amplifier 15 by means of the color-killer circuit 21, the in-phase detector also controls the sensitivity of the quadrature-phase detector so that it is most sensitive when the oscillator is not synchronized and least sensitive when the average phase relation of the color burst and locally generated signals is proper. A portion of the potential developed across the resistors 49 and 50 is applied through the secondary winding of the transformer 32 so that a negative bias is placed on the deflection electrodes 41 and 42 when the color burst and locally generated signals are properly phased. This causes the quadrature phase detector including the deflection electrodes 41 and 42 and the anodes 35 and 36 to be least sensitive when the signals are properly phased on the average. When substantially zero potential is developed across the resistors 49 and 50, representing lack of synchronization of the oscillator 17, then no negative bias is applied to the deflection electrodes 41 and 42 and the sensitivity of the quadrature-phase detector is maximum.

To summarize the above explanation, the color burst signal is applied to the control electrode 38, amplified and utilized by means of the deflection electrodes 41 and 42 and anodes 35 and 36 to develop a quadrature phase control potential. An in-phase potential is developed in a circuit coupled to the screen electrode 40 of the tube 31. This in-phase potential is utilized in the color-killer circuit 21 in a conventional manner to control the state of conduction of the chroma amplifier 15. In addition, this potential is utilized as a bias potential on the deflection electrodes 41 and 42 to cause the quadrature-phase detector to be least sensitive when the average phase relation of the color burst and locally generated signal is proper and to be most sensitive when such phasing does not exist. Thus, the first phase-detection circuit, more specifically, the in-phase detection circuit of the tube 31 includes a pair of output circuits in one of which the in-phase control potential is developed and in the other of which an amplified color burst signal is present. The quadrature-phase detection circuit is effectively in series with the in-phase detection circuit and is responsive to the amplified color burst signal and the locally generated signal to develop the quadrature-phase control potential.

Figure 3:
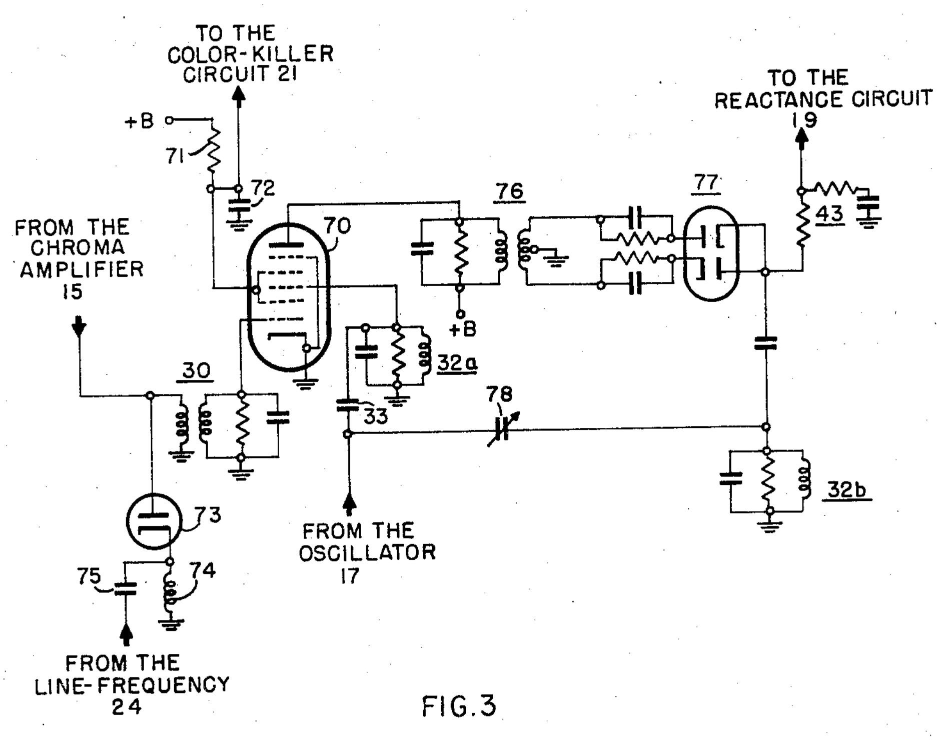
Fig. 3 is a detailed circuit diagram of another embodiment of such phase detector.

*Description and explanation of operation of the phase detector of Fig. 3*

In the phase detector represented by Fig. 2, the in-phase and quadrature-phase detection circuits are included in the same tube. In order to obtain more gain for the amplified color burst signal or for other reasons, it may be desirable to separate these detection circuits and arrange them in cascade as amplifiers are conventionally arranged. Such is done in the phase detector of Fig. 3. Since some of the circuits and circuit elements of Fig. 3 are identical with circuits or circuit elements in Fig. 2, such are identified by the same reference numerals.

In the phase detector of Fig. 3, the first detection circuit comprises a multielectrode vacuum tube 70 having the cathode thereof connected to chassis ground, the first control electrode thereof connected to the tuned secondary winding of the transformer 30, and a second control electrode coupled through the condenser 33 to a source of locally generated signal such as the oscillator 17. The tuned circuit 32*a* is coupled between the second control electrode and chassis ground and may, if there is need for such to correct phasing, serve as a phase-shift circuit. An intermediate electrode of the tube 70 is coupled through a load resistor 71 to a source of positive potential and through a by-pass condenser 72 to chassis ground for developing at the junction of the resistor 71 and the condenser 72 the in-phase control potential. The primary winding of the transformer 30 is shunted by means of the series circuit of a diode 73 and an inductor 74. The terminal on the deflection winding of the output transformer of the line-frequency generator 24 is coupled through a condenser 75 to the cathode of the diode 73.

The circuit just described is the in-phase detector and includes the diode 73 for gating the color burst signal for application to the control electrode of the tube 70. The diode 73 is normally conductive and is rendered nonconductive by a positive flyback pulse during the duration of the color burst signal. The color burst signal and the locally generated signal heterodyne in the tube 70 to develop an in-phase control potential at the junction of the resistor 71 and the condenser 72. In addition, the color burst signal is amplified and developed across an anode load circuit including the tuned primary winding of a transformer 76.

The second phase-detection circuit or quadrature-phase detection circuit in cascade with the in-phase detection circuit includes a conventional balanced phase detector 77 coupled to the secondary winding of the transformer 76 for applying the amplified color burst signal thereto. The phase-detection circuit 77 is also coupled through a phase-adjusting condenser 78 to a source of the locally generated signal, for example, to the oscillator 17. The phase detector 77 also includes a further phase-shift circuit 32_b_ for shifting the phase of the locally generated signal by 90°. The output circuit 43 of the phase-detection circuit 77 develops a quadrature-phase control potential in a conventional manner. In the phase detector of Fig. 3, it is apparent that the quadrature phase-detection circuit 77 is connected in series with the in-phase detection circuit including the tube 70. The in-phase detection circuit develops not only the in-phase control potential for application to the color-killer circuit 21, but also amplifies the color burst signal for application through the transformer 76 to the quadrature-phase detection circuit 77.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A phase detector for developing both in-phase and quadrature-phase control signals for the color-signal deriving circuits of an NTSC type of color-television receiver comprising: means for supplying a color burst synchronizing signal; means for supplying a locally generated subcarrier wave signal; an electron-discharge device having a pair of anodes, a plurality of control electrodes, a pair of beam-deflecting electrodes, and a cathode for emitting a single stream of electrons flowing in the vicinity of said control electrodes between said beam-deflecting electrodes and toward said anodes; a first phase-detection circuit including one of said control electrodes responsive to said color burst signal for intensity-modulating said electrons and another of said control electrodes responsive to said locally generated signal for heterodyning with said color burst signal, including a phase-shift circuit coupled to at least one of said control electrodes so that said color burst and locally generated signals have a specific average phase relation on said control electrodes, and including an output circuit coupled to said other control electrode for developing one of said control signals therein; and another phase-detection circuit including said anodes and said beam-deflecting electrodes and a phase-shift circuit for applying said locally generated signal to said beam-deflecting electrodes with a phase in quadrature to that of the signal applied to said other control electrode to cyclically deflect said intensity-modulated electrons sequentially to impinge on said anodes for developing said other control signal.

2. A phase detector for developing both in-phase and quadrature-phase control signals for the color-signal deriving circuits of an NTSC type of color-television receiver comprising: means for supplying a color burst synchronizing signal; means for supplying a locally generated subcarrier wave signal; an electron-discharge device having a pair of anodes, a plurality of control electrodes, a pair of beam-deflecting electrodes, and a cathode for emitting a single stream of electrons flowing in the vicinity of said control electrodes between said beam-deflecting electrodes and toward said anodes; an in-phase phase-detection circuit including one of said control electrodes responsive to said color burst signal for intensity-modulating said electrons and another of said control electrodes responsive to said locally generated signal for heterodyning with said color burst signal, including a phase-shift circuit coupled to at least one of said control electrodes so that said color burst and locally generated signals are in phase on said control electrodes, and including an output circuit coupled to said other control electrode for developing said in-phase control signal therein; and a quadrature-phase phase-detection circuit including said anodes and said beam-deflecting electrodes and a phase-shift circuit for applying said locally generated signal to said beam-deflecting electrodes with a phase in quadrature to that of the signal applied to said other control electrode to cyclically deflect said intensity-modulated electrons sequentially to impinge on said anodes for developing said quadrature-phase control signal.

3. A phase detector for developing both in-phase and quadrature-phase control signals for the color-signal deriving circuits of an NTSC type of color-television receiver comprising: means for supplying a color burst synchronizing signal; means for supplying a locally generated subcarrier wave signal; an electron-discharge device having a pair of anodes, a plurality of control electrodes, a pair of beam-deflecting electrodes, and a cathode for emitting a single stream of electrons flowing in the vicinity of said control electrodes between said beam-deflecting electrodes and toward said anodes; an in-phase phase-detection circuit including one of said control electrodes responsive to said color burst signal for intensity-modulating said electrons and another of said control electrodes responsive to said locally generated signal for heterodyning with said color burst signal, including a phase-shift circuit coupled to at least one of said control electrodes so that said color burst and locally generated signals are in phase on said control electrodes, and including an output circuit coupled to said other control electrode for developing said in-phase control signal therein; a quadrature-phase phase-detection circuit including said anodes and said beam-deflecting electrodes and a phase-shift circuit for applying said locally generated signal to said beam-deflecting electrodes with a phase in quadrature to that of the signal applied to said other control electrode to cyclically deflect said intensity-modulated electrons sequentially to impinge on said anodes for developing said quadrature-phase control signal; and means for utilizing said in-phase control signal to control the gain of said quadrature-phase phase-detection circuit.

4. A phase detector for developing both in-phase and quadrature-phase control signals for the color-signal deriving circuits of an NTSC type of color-television receiver comprising: means for supplying a color burst synchronizing signal; means for supplying a locally generated subcarrier wave signal; an electron-discharge device having a pair of anodes, a plurality of control electrodes, a pair of beam-deflecting electrodes, and a cathode for emitting a single stream of electrons flowing in the vicinity of said control electrodes between said beam-deflecting electrodes and toward said anodes; an in-phase phase-detection circuit including one of said control electrodes responsive to said color burst signal for intensity-modulating said electrons and another of said control electrodes responsive to said locally generated signal for heterodyning with said color burst signal, including a phase-shift circuit coupled to at least one of said control electrodes so that said color burst and locally generated signals are in phase on said control electrodes, and including an output circuit coupled to said other control electrode for developing said in-phase control signal therein; a quadrature-phase phase-detection circuit including said anodes and said beam-deflecting electrodes and a phase-shift circuit for applying said locally generated signal to said beam-deflecting electrodes with a phase in quadrature to that of the signal applied to said other control electrode to cyclically deflect said intensity-modulated electrons sequentially to impinge on said anodes for developing said quadrature-phase control signal; and means for applying at least a fraction of said in-phase control signal to said beam-deflecting electrodes to control the gain of said quadrature-phase phase-detection circuit.

5. A phase detector for developing both in-phase and quadrature-phase control signals comprising: means for supplying a first signal; means including a phase-shifting means for supplying a second signal with two phases in quadrature; first phase-detection means, including a pair of output circuits, said detection means being responsive to said first signal and one phase of said second signal having a specific average phase relation in said first detection means for developing in one of said output circuits a control signal, and being responsive to said first signal for developing in another of said output circuits an amplified signal representative of said first signal; and second phase-detection means coupled in series with said first detection means and responsive to said amplified signal and to the other phase of said second signal having an average phase relation in quadrature with said specific phase relation for developing therefrom a second control signal.

6. A phase detector for developing both in-phase and quadrature-phase control signals comprising: means for supplying a signal of reference phase; means including a phase-shifting means for supplying a signal of controllable phase with two phases in quadrature; first phase-detection means, including a pair of output circuits, said detection means being responsive to said reference signal and one phase of said controllable signal having a specific average phase relation in said first phase-detection means for developing in one of said output circuits a control signal, and being responsive to said reference signal for developing in another of said output circuits an amplified signal representative of said reference signal; and second phase-detection means coupled in series with said first detection means and responsive to said amplified signal and to the other phase of said controllable signal having an average phase relation in quadrature with said specific phase relation for developing therefrom a second control signal.

7. A phase detector for developing both in-phase and quadrature-phase control signals comprising: means for supplying a first signal; means including a phase-shifting means for supplying a second signal with two phases in quadrature; first phase-detection means, including a pair of output circuits, said detection means being responsive to said first signal and one phase of said second signal having a specific average phase relation in said first detection means for developing in one of said output circuits a control signal, and being responsive to said first signal for developing in another of said output circuits an amplified signal representative of said first signal; second phase-detection means coupled in series with said first detection means and responsive to said amplified signal and to the other phase of said second signal having an average phase relation in quadrature with said specific phase relation for developing therefrom a second control signal; and means for utilizing one of said control signals to control the gain of one of said phase-detection means.

8. A phase detector for developing both in-phase and quadrature-phase control signals comprising: means for supplying a first signal; means including a phase-shifting means for supplying a second signal with two phases in quadrature; a multielectrode electron-discharge device; first phase-detection means, including a portion of said device coupled to one of a pair of output circuits, said detection means being responsive to said first signal and one phase of said second signal having a specific average phase relation in said first detection means for developing in one of said output circuits a control signal, and being responsive to said first signal to develop in the other of said output circuits an amplified signal representative of said first signal; and second phase-detection means including another portion of said device coupled in series with said first detection means and responsive to said amplified signal and to the other phase of said second signal having an average phase relation in quadrature with said specific phase relation for developing therefrom a second control signal.

9. A phase detector system for the synchronization of a television receiver comprising: a current conductive device having a cathode, two output electrodes, and a plurality of current control electrode means capable of controlling the distribution of current between the output electrodes; means for varying said current distribution between said output electrodes as the phase relation between an applied signal of reference phase and a locally generated signal of controllable phase varies including one means for supplying said reference signal to one of said control-electrode means and another means for supplying to another of said control-electrode means said controllable signal in quadrature-phase relation with said reference signal; and load means including impedances individually coupled between said cathode and said output electrodes and responsive to a predetermined ratio of said current distribution for developing a resultant signal representative of a corresponding predetermined condition of said phase relation.

10. A phase detector system for the synchronization of a television receiver comprising: a current conductive device having a cathode, two output electrodes, and a plurality of current control electrode means capable of controlling the distribution of current between the output electrodes; means for varying said current distribution between said output electrodes as the phase-relation between an applied signal of reference phase and a locally generated signal of controllable phase varies including one means for supplying said reference signal to one of said control-electrode means and another means for supplying to another of said control-electrode means said controllable signal in quadrature-phase relation with said reference signal; load means including impedances individually coupled between said cathode and said output electrodes and responsive to a predetermined ratio of said current distribution for developing a resultant signal representative of a corresponding predetermined condition of said phase relation; and means coupled to said control-electrode means and responsive to the cathode current of said device for minimizing the gain of the system when such predetermined phase relation exists and for maximizing it when it does not exist.

11. A phase detector for developing both in-phase and quadrature-phase control signals comprising: means for supplying a signal of reference phase; means for supplying a signal of controllable phase; in-phase phase-detection means including a pair of output circuits and being responsive to the supplied signals for developing said in-phase control signal in one of said output circuits and said reference signal amplified in the other of said output circuits, said phase-detection means also including phase-shift means for modifying the phase relation between the supplied signals so they are in-phase in said phase-detection means; and quadrature-phase phase-detection means coupled in series with said in-phase phase-detection means and being responsive to said amplified reference signal and said signal of controllable phase for developing said quadrature-phase control signal, said quadrature-phase phase-detection means including phase-shift means for modifying the phase relation between said amplified reference signal and said controllable-phase signal so they are substantially in said quadrature phase in said quadrature-phase detection means.

12. A phase detector for developing both in-phase and quadrature-phase control signals comprising: means for supplying a signal of reference phase; means for supplying a signal of controllable phase; first phase-detection means including a pair of output circuits and an electron-discharge device responsive to the supplied signals for developing one of said control signals in one of said output circuits and one of said supplied signals amplified in the other of said output circuits, said phase-detection means also including phase-shift means for modifying the phase relation between the supplied signals so they have a specific average phase relation in said phase-detection means; and second phase-detection means including a second electron-discharge device coupled in cascade with said first phase-detection means and being responsive to said amplified signal and the other of said supplied signals for developing the other of said control signals, said quadrature-phase phase-detection means including phase-shift means for modifying a phase relation between said amplified signal and the other of said supplied signals so they are substantially in quadrature with said specific phase relation in said second detection means.

13. A phase detector for developing both in-phase and quadrature-phase control signals comprising: means for supplying a signal of reference phase; means for supplying a signal of controllable phase; first phase-detection means including an electron-discharge device having a pair of control electrodes, a screen electrode and an anode, and having one output circuit coupled to the screen electrode and another output circuit coupled to the anode, said control electrodes being responsive to the supplied signals for developing one of said control signals in said one of said output circuits and one of the supplied signals amplified in the other of said output circuits, said phase-detection means also including phase-shift means coupled to one of said control electrodes for modifying the phase relation between the supplied signals so they have a specific average phase relation in said phase-detection means; and second phase-detection means including another electron-discharge device coupled to said anode output circuit and being responsive to said amplified signal and the other of said supplied signals for developing said other control signal, said second phase-detection means including phase-shift means for modifying the phase relation between said amplified signal and said other supplied signal so they have, in said second phase-detection means, an average phase relation in quadrature with said specific average phase.

14. A phase detector for developing both in-phase and quadrature-phase control signals comprising; means for supplying a signal of reference phase; means for supplying a signal of controllable phase; in-phase phase-detection means including a pair of output circuits and being responsive to the supplied signals for developing said in-phase control signal in one of said output circuits and said reference signal amplified in the other of said output circuits said phase-detection means including circuit means resonant at the frequency of said controllable-phase signal for modifying the phase thereof so that both of said supplied signals are in-phase in said phase-detection means; and quadrature-phase phase-detection means coupled in series with said in-phase phase-detection means and being responsive to said amplified reference signal and said signal of controllable phase for developing said quadrature-phase control signal, said quadrature-phase phase-detection means including circuit means resonant at said frequency for modifying the phase of said controllable-phase signal so that said amplified reference signal and said controllable-phase signal are substantially in quadrature phase in said quadrature-phase detection means.

References Cited in the file of this patent

UNITED STATES PATENTS

| | | |
|---|---|---|
| 2,527,096 | Howes | Oct. 24, 1950 |
| 2,554,391 | Tellier et al. | May 22, 1951 |
| 2,666,136 | Carpenter | Jan. 12, 1954 |
| 2,703,380 | Fraser | Mar. 1, 1955 |